United States Patent
Truong (10) Patent No.: US 6,216,187 B1
(45) Date of Patent: *Apr. 10, 2001

(54) SYSTEM FOR POWERING DOWN A PORTABLE COMPUTER IN A DOCKING STATION

(75) Inventor: Cuong Cam Truong, Tustin, CA (US)

(73) Assignee: Toshiba America Information Systems, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/984,118

(22) Filed: Dec. 1, 1997

(51) Int. Cl.[7] .................................................. G06F 13/00

(52) U.S. Cl. ............................................ 710/103; 710/102

(58) Field of Search ................................... 395/281–283, 395/750.02, 750.05, 750.06, 750.07; 361/868, 683; 710/101–103; 713/310, 323, 324, 330

(56) References Cited

U.S. PATENT DOCUMENTS

| | | |
|---|---|---|
| 5,167,024 | 11/1992 | Smith et al. . |
| 5,230,074 | 7/1993 | Canova, Jr. et al. . |
| 5,297,282 | 3/1994 | Meilak et al. . |
| 5,313,596 * | 5/1994 | Swindler et al. ............... 710/103 |
| 5,323,291 * | 6/1994 | Boyle et al. .................... 361/683 |
| 5,339,426 | 8/1994 | Aoshima . |
| 5,347,425 * | 9/1994 | Herron et al. .................. 361/683 |
| 5,394,552 | 2/1995 | Shirota . |
| 5,410,711 | 4/1995 | Stewart . |
| 5,428,790 | 6/1995 | Harper et al. . |
| 5,471,624 | 11/1995 | Enoki et al. . |
| 5,481,733 | 1/1996 | Douglis et al. . |
| 5,483,656 | 1/1996 | Oprescu et al. . |
| 5,488,572 | 1/1996 | Belmont . |
| 5,504,907 | 4/1996 | Stewart et al. . |
| 5,504,910 | 4/1996 | Wisor et al. . |
| 5,511,205 | 4/1996 | Kannan et al. . |
| 5,530,879 | 6/1996 | Crump et al. . |
| 5,535,400 | 7/1996 | Belmont . |
| 5,546,590 * | 8/1996 | Pierce ........................... 395/750.01 |
| 5,560,017 | 9/1996 | Barrett et al. . |
| 5,560,022 | 9/1996 | Dunstan et al. . |
| 5,560,024 | 9/1996 | Harper et al. . |
| 5,566,340 | 10/1996 | Stewart et al. . |
| 5,574,920 | 11/1996 | Parry . |

(List continued on next page.)

OTHER PUBLICATIONS

Intel Corporation/Microsoft Corporation; Advanced Power Management (APM) BIOS Interface Specification, Revision 1.2, Feb. 1996.

Primary Examiner—Robert W. Beausoliel, Jr.
Assistant Examiner—Raymond N Phan
(74) Attorney, Agent, or Firm—Pillsbury Winthrop LLP (57) ABSTRACT

A method of powering down a computer system when the operating system is running. According to the method, it is determined when the computer system is to be powered down and if power management mode is enabled. If the power management mode is enabled and the computer system is not docked with a docking station, the computer system is powered down by saving the system state and then removing power from the computer system's processing unit. Alternatively, if the power management mode is enabled and the computer system is docked, the computer system is powered down by placing the computer system in a mode in which the keyboard and display are locked. In one embodiment, the computer system is powered down when the power management mode is disabled by causing the operating system to exit and then removing power from the computer system. A portable computer that includes the system for powering down of the present invention is also provided.

6 Claims, 4 Drawing Sheets

U.S. PATENT DOCUMENTS

| | | |
|---|---|---|
| 5,590,340 | 12/1996 | Morita et al. . |
| 5,590,342 | 12/1996 | Marisetty . |
| 5,598,537 * | 1/1997 | Swanstrom et al. .................. 395/281 |
| 5,603,040 | 2/1997 | Frager et al. . |
| 5,606,704 | 2/1997 | Pierce et al. . |
| 5,619,729 | 4/1997 | Bland et al. . |
| 5,623,677 | 4/1997 | Townsley et al. . |
| 5,628,029 | 5/1997 | Evoy . |
| 5,630,148 | 5/1997 | Norris . |
| 5,632,037 | 5/1997 | Maher et al. . |
| 5,634,131 | 5/1997 | Matter et al. . |
| 5,638,083 | 6/1997 | Margeson . |
| 5,649,212 | 7/1997 | Kawamura et al. . |
| 5,649,213 | 7/1997 | Kurihara et al. . |
| 5,652,890 | 7/1997 | Foster et al. . |
| 5,652,895 | 7/1997 | Poisner . |
| 5,655,124 | 8/1997 | Lin . |
| 5,664,118 * | 9/1997 | Nishigaki et al. .................... 395/283 |
| 5,784,576 * | 7/1998 | Guthrie et al. ....................... 710/103 |
| 5,798,951 * | 8/1998 | Cho et al. .......................... 364/708.1 |
| 5,822,547 * | 10/1998 | Boesch et al. ....................... 395/283 |
| 5,832,237 * | 11/1998 | Lee ...................................... 395/281 |
| 5,832,285 * | 11/1998 | Shimada .......................... 395/750.05 |
| 5,862,349 * | 1/1999 | Cho et al. ............................ 395/283 |
| 5,867,406 * | 2/1999 | Yanagisawa ..................... 364/708.01 |
| 5,878,211 * | 3/1999 | Delagrange et al. ................ 713/200 |
| 5,901,292 * | 5/1999 | Nishigaki et al. ................... 710/103 |

\* cited by examiner

SYSTEM FOR POWERING DOWN A PORTABLE COMPUTER IN A DOCKING STATION

FIELD OF THE INVENTION

The present invention relates to a system for powering down a portable computer, and more specifically to a system that reliably and efficiently powers down a portable computer having a power saving mode.

BACKGROUND OF THE INVENTION

In conventional computer systems, a user initiates a powering down of the system by pressing an on/off switch. In response, the system is typically powered down by simply cutting power to the system. When power is removed from the system, the contents of registers and memory locations associated with the system's microprocessor and peripheral devices are generally lost. When power is later restored to power up the system, an initialization routine must be executed to place the system in a known initial state. In particular, any operating system and application programs that were running on the system prior to power down must be reloaded and restarted. Besides creating a long delay before the computer system is restored to its previous operating state, such conventional powering down can cause unsaved data associated with the operating system and/or application programs to be lost. This loss of data may result in a loss of some or all of the user's work product, and may even cause the computer system to crash or run improperly on the subsequent power up.

Portable computer systems such as laptops and notebooks comprise a quickly growing segment of the commercial market for computers. Portable computers are typically self-contained systems that can be operated on battery power in situations where the user does not have access to an AC power source (e.g., in an airplane or on a bus). System designers have been working to reduce the power consumption of portable computer systems in order to maximize the operating life of the system when running on battery power. In this regard, various techniques have been devised for reducing power consumption by manipulating clock signals and/or power supplies with respect to inactive circuit portions. Typically, a power management unit detects or predicts inactive circuit portions and accordingly turns off the clock signals that drive the inactive circuit portions in order to decrease the overall power consumption of the system. Similarly, the frequency of clock signals can be reduced during operations that are not time critical, and power can be removed from inactive circuit portions.

The Advanced Power Management (APM) system is a standardized power reduction system for use with personal computers. The definition of the APM standard can be found in "Advanced Power Management (APM) BIOS Interface Specification" (Rev. 1.2, February 1996), which is published by Intel Corporation (Santa Clara, Calif.) and Microsoft Corporation (Redmond, Wash.) and is herein incorporated by reference. Computer systems that operate in accordance with the APM standard allow the operating system to initiate idle calls to determine whether various application programs are busy or idle. In response to an idle call, each application program returns an idle indication to the operating system if it is idle. If all application programs running on the system return an idle indication, the operating system passes the all-idle indication to the system BIOS (Basic Input/Output System). The BIOS may then take power reduction steps such as reducing the frequencies of selected clock signals and/or removing power from selected inactive circuit portions. If any application program later becomes active, the system BIOS exits the reduced power state by causing the clock signals to return to their normal levels and/or power to be reapplied to the various circuit portions.

In more detail, the APM system defines four power management states: a normal operating state, a standby state, a suspend state, and an off state. The APM power management driver (APM driver) runs in the background (i.e., in the BIOS and the operating system) so it is transparent to the user. The portion of the APM driver in the operating system (APM OS driver) is present in operating systems such as the Windows 95™ operating system sold by Microsoft Corporation, and the portion of the APM driver in BIOS (APM BIOS driver) is provided by the system designer. The APM OS driver and the APM BIOS driver communicate with one another so as to operate together (i.e., as the APM driver) to control the computer's transition between the four APM states. Typically, state transitions are handled by the APM driver based on the states of a switch, a flag, an activity timer, a wake alarm, and/or a ring detector.

The normal operating state is virtually identical to the normal operating state of a computer system that does not perform power management. Likewise, the off state is virtually identical to the powered down state of a conventional computer system. In the off state, the power supply does not provide any power, and the state of the computer system prior to entering the off state is lost. In addition to the normal and off states, the APM standard defines two reduced power states—the standby and suspend states.

The standby state uses less power than the normal operating state, yet leaves any applications executing as they would otherwise execute. In general, power is conserved in the standby state by placing devices into low-power modes of operation (e.g., by ceasing the revolutions of the hard disk and by ceasing generation of the video signal). In contrast, when the computer system is in the suspend state, an extremely small amount of power is consumed. Such low power consumption is obtained by saving the state of the computer system to the hard drive and then turning "off" the power supply.

To enter the suspend state, the computer system must interrupt any executing code and transfer control to the APM driver, which ascertains the state of the computer system and writes the state to the hard disk (or RAM that does not lose power). In particular, the state of the CPU registers, the CPU cache, the system memory, the system cache, the video registers, the video memory, and the other devices' registers must all be saved to the hard disk. In other words, the entire state of the system is saved so that it can be restored without the executing application programs being adversely affected by the transition to suspend mode. The suspend condition is then indicated in non-volatile memory, and power is removed from the system. Thus, the state of the system is saved to the hard disk, system power is "off," and only a small amount of power is consumed by circuitry that monitors for events that cause the system to "wake-up" from the suspended state.

While such power management features have made portable computers more popular, many users desire a portable computer that has the same capabilities as a desktop computer. For such users, the expense of purchasing a second computer system for its portability, in addition to a fully functional desktop computer system, is difficult to justify. In effect, the user would own two nearly identical computer systems, only one of which is usually operating at a time. In order to provide a fully capable yet portable computer system, portable computers have been developed that can be coupled to a separate stationary unit. For example, the stationary unit may include features such as additional storage capacity (e.g., a large hard drive), additional display capabilities (e.g., a larger CRT display), and additional input capabilities (e.g., a larger keyboard). Such a stationary unit is known as a "docking station." The docking station usually is kept in one location and remains coupled to local area networks, the telephone system, peripherals, and an AC power source. After docking the portable computer, the user can access these resources.

In some conventional docking stations, the method of coupling the portable computer to the docking station uses a mechanical system (e.g., a latch system) that mates the computer and docking station. With such a station, undocking can be performed while an application is running on the system, but this will cause the system to crash and unsaved data to be lost. In more sophisticated docking stations, the portable computer and docking station are coupled together using a mechanically triggered electromechanical docking/ undocking mechanism. This type of station increases the reliability of the interconnection through mechanical and electrical interlocks and prevents undocking in undesirable situations (e.g., when an application is running on the system).

While some conventional docking stations can lessen the chance of data loss by preventing undocking when the computer system is turned on, data may still be lost with such systems if the user powers down the system while the operating system is still running. In conventional systems, when the user presses the power switch, power is almost immediately removed from the computer system regardless of whether any software (i.e., operating system or application programs) is running on the system. Thus, unsaved data associated with the running operating system and application programs (e.g., the user's work product and important system data) can be lost. Further, saved data is typically stored in write buffers for a period before being written to disk, so the user may actually lose data that was believed to be saved. Similarly, if data is still being written to the disk when power is removed, the user's file may be corrupted and become unreadable. Additionally, conventional portable computer systems are powered down in the same manner when docked and undocked.

SUMMARY OF THE INVENTION

In view of these drawbacks, it is an object of the present invention to remove the above-mentioned drawbacks and to provide a system that reliably and efficiently powers down a portable computer having a power saving mode. The power down system determines the best system shut down sequence that will prevent data loss based on whether the portable computer is docked or undocked and whether the power saving mode is enabled or disabled. The chosen shut down sequence ensures that before power is removed from the computer system, either: the operating system and all application programs are exited; or the current state of the system is made recoverable. Thus, before power is removed, data associated with the running operating system and application programs is saved and the operating system is given the chance to flush all write buffers so that system and user data is not lost and files are not corrupted. In this manner, the shut down system of an embodiment of the present invention lessens the chance of data loss when the system is powered down.

According to a first embodiment of the present invention, a method of powering down a computer system is provided. According to the method, it is determined when the computer system is to be powered down and whether power management mode is enabled. If the power management mode is enabled and the computer system is not docked with a docking station, the computer system is powered down by saving the system state and then removing power from the computer system's processing unit. Alternatively, if the power management mode is enabled and the computer system is docked, the computer system is powered down by placing the computer system in a mode in which the keyboard and display are locked. In one preferred embodiment, the computer system is powered down when the power management mode is disabled by causing the operating system to exit and then removing power from the computer system.

According to a second embodiment of the present invention, a portable computer that can be docked with a docking station is provided. The portable computer includes a CPU, RAM, at least one peripheral device, and a power switch for powering the portable computer up and down. Additionally, the portable computer includes power management circuitry that selectively reduces power consumption, and a power management enable switch that controls the power management circuitry. When the portable computer is powered up and the power switch is activated, the portable computer is powered down in a manner dependent on the current state of the system. If the power management circuitry is enabled and the portable computer is not docked, the system state is saved and then power is removed from the CPU. If the power management circuitry is enabled and the portable computer is docked, the keyboard and display are locked. In one preferred embodiment, if the power management circuitry is disabled, the portable computer is powered down by exiting the operating system and then removing power from the portable computer.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
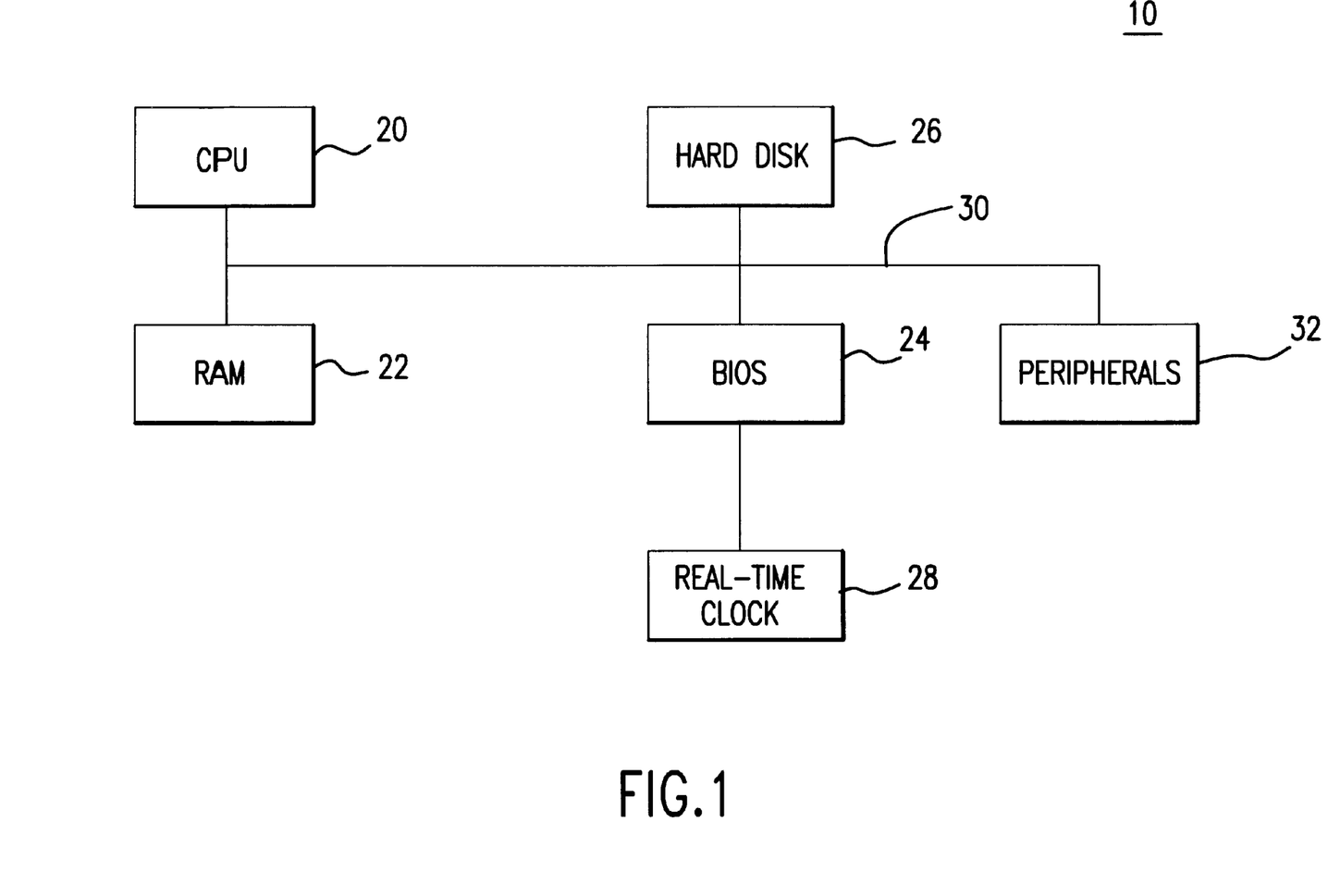
FIG. 1 is a block diagram of a portable computer system.

FIG. 1 shows a block diagram of a portable computer system 10. As shown, the portable computer system includes a central processing unit (CPU) 20 that is connected by a system bus 30 to a random access memory (RAM) 22, a BIOS memory 24, and a hard disk 26. An internal, battery-backed, clock (i.e., a real-time clock) 28, which includes a memory for storing the current date and time, is coupled to the BIOS memory 24. When the system is booted, the BIOS is used to configure the system in accordance with the data in a setup memory and the hardware devices that are coupled to the system.

During system operation, the portable computer 10 runs an operating system that facilitates communication between application programs and the BIOS. In one embodiment, the operating system is a version of the Windows™ operating system sold by Microsoft Corporation. The Windows™ operating system is stored on the hard disk and is loaded into the computer system during the boot-up procedure. When started, the operating system sets various system parameters based on the system configuration, and stores these parameters in a configuration file that is accessed by the application programs. Because the BIOS configures the system at boot-up and the operating system sets system parameters at startup based upon the BIOS-generated system configuration, new peripheral devices cannot be added to the system after boot-up. In other words, the system does not provide "plug-and-play" capabilities. In order to use a new peripheral device with the system, the system must be re-booted (after connecting the device) so that the BIOS can configure the system in such a way as to define an interface with the new peripheral device.

The operating system also maintains a "clock" for displaying date and time information on the portable computer. In particular, date and time information is retrieved from the real-time clock when the operating system is initialized. The operating system stores this initial date and time information in the RAM, and then keeps track of the time by incrementing the stored values using an internal clock signal. While the operating system is running, the current date and time information stored in the RAM is used by the operating system to display the time for the user and to time-stamp activities.

In addition to the operating system, the system software includes device drivers that support peripheral devices such as a sound card, a network adapter, and a CD-ROM drive. The device drivers execute on the CPU in response to hardware interrupts initiated by the corresponding peripheral devices. During execution of one of the device drivers, several values relevant to the operation of the corresponding device (e.g., data to be processed and program counter value) may be stored in the general registers of the CPU. Additionally, the drivers may transfer data between the peripheral devices and the system RAM.

Figure 2:
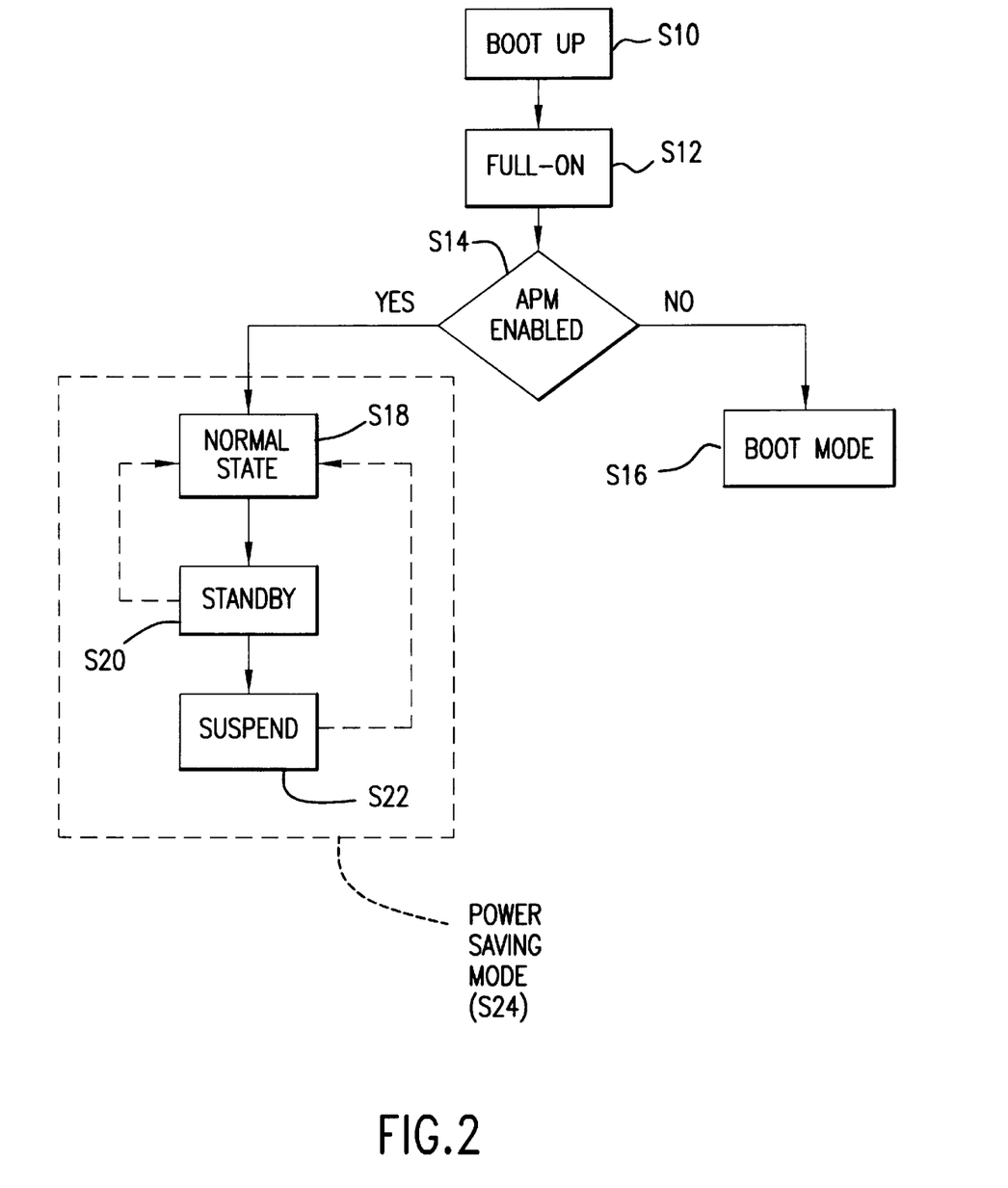
FIG. 2 is a diagram of a power management system for the portable computer of FIG. 1.

FIG. 2 shows a diagram of the power management system in the portable computer of FIG. 1. The power management features of the computer system include support for the Advanced Power Management (APM) system. As explained above, the APM system (through the APM driver) can transition the system between several states in order to reduce power consumption. In a preferred embodiment, an APM switch is provided on the portable computer to allow the user to enable or disable the APM system features. When initially powered up (S10), the computer system is booted and all hardware components receive full power. In this state, the computer system is said to be "full-on" (S12). If the APM switch is set so that the APM features are disabled (S14), the portable computer remains in the full-on state until the user powers down the system. This is known as the "boot mode" of operation (S16).

On the other hand, if the APM features are enabled by the APM switch (S14), the portable computer is in the "power saving mode" of operation (S24). In the power saving mode, the APM features are enabled so that the APM driver transitions the system between the normal (full-on) operating state (S18), the standby state (S20), and the suspend state (S22) on the basis of system activity. More specifically, after a specified period of system inactivity (e.g., when no interrupts are initiated by peripheral devices), the computer system transitions from the normal operating state (S18) to the standby state (S20), and then after another specified period of inactivity, the system transitions from the standby state (S20) to the suspend state (S22).

In the transition to the suspend state (S22), the contents of the general registers of the CPU are saved in the RAM and then power is removed from the CPU and other components, with the notable exception of the RAM that stores the state of the CPU. Additionally, the system software calls the device drivers to notify them of the transition to the suspend state (S22). When called, the device drivers operate to store relevant information in the RAM so that the drivers will not have to be re-initialized when the system transitions back to the normal operating state (S18). Thus, a driver that was executing when the system entered the suspend state (S22) can use the stored values to allow processing to continue from the point at which processing was suspended. In further embodiments, the system information is stored on the hard disk as explained above.

When the system is in the suspend state (S22) and a wake-up event occurs (e.g., an interrupt is generated in response to mouse movement, keyboard use, or other peripheral device input), the APM driver returns the computer system to the normal (full-on) operating state (S18). Specifically, power is restored to the CPU and other components, and the contents of the general registers of the CPU, which were stored in the RAM, are reloaded so that execution can resume from the point at which it was suspended upon the state transition. Additionally, the date and time information that is maintained in the RAM is not updated while the system is in the suspend state (S22). Therefore, the system software must re-initialize the operating system "clock" by re-retrieving the date and time information from the real-time clock. This allows the proper time to be displayed after the return to the normal operating state (S18).

The portable computer system 10 also includes a docking feature that allows the user to mechanically and electronically engage the portable computer with a docking station. In a preferred embodiment, the docking station directly couples the portable computer with a network, an additional storage device, a CRT monitor, and a standard size (i.e., desktop-type) keyboard. In order to dock the portable computer with the docking station, the portable computer is inserted into the docking station and is then booted up (or re-booted) so that the BIOS can configure the system to include the connection with the docking station. Once booted, the computer system can be used in the normal manner and the additional capabilities offered by the docking station can be used. Further, when the portable computer is docked with the docking station, the portable computer can be put into an "instant security mode" in which the keyboard and display are locked. That is, the keyboard does not generate any input and the display is blanked.

To undock the portable computer from the docking station, the user presses an eject switch that performs the operations necessary to disconnect the computer system from the network and mechanically disengage the portable computer from the docking station. That is, the activation of the eject switch generates an interrupt, and the interrupt causes a utility program to begin the undocking procedure. In a preferred embodiment, the portable computer system does not have "plug-and-play" capabilities so the portable computer will not finction properly after being undocked until the system is re-booted to allow the BIOS to remove the connection with the docking station. Therefore, if the user presses the eject switch while the portable computer is docked and the operating system is running, the system software prevents the portable computer from undocking.

Figure 3:
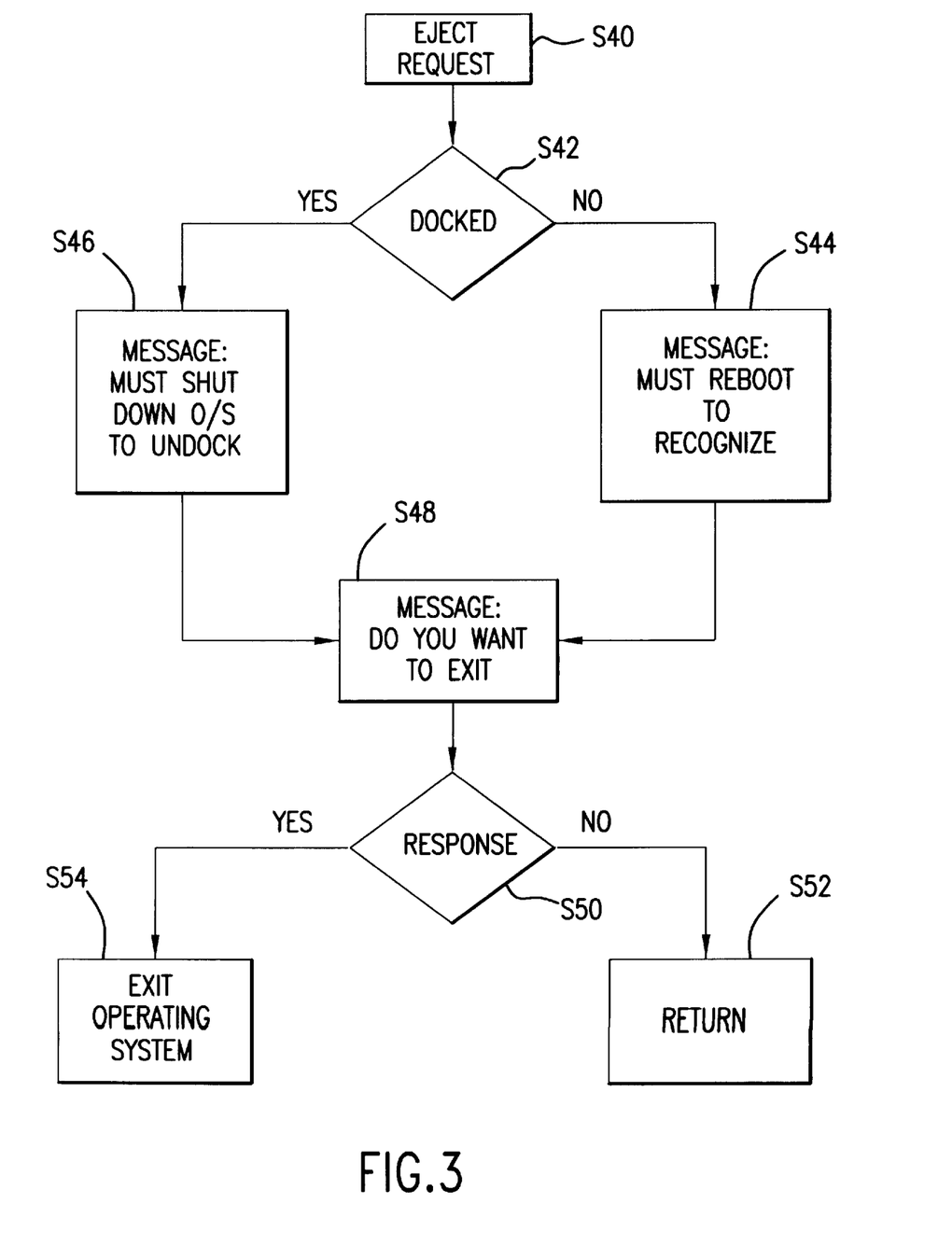
FIG. 3 is a flow chart for an undocking protection system.

The undocking protection system is shown in greater detail in the flow chart of FIG. 3. The system software includes an undocking utility program that is executed when the operating system is active and an interrupt is generated by the eject switch (step S40). The program first checks the configuration file to see if the portable computer is docked (step S42). If the portable computer is docked, the program does not initiate the undocking procedure but instead displays a message on the display (step S46). The message advises the user that the operating system does not have "plug-and-play" capabilities and that the machine must be powered down before the portable computer can be undocked. On the other hand, if the configuration file indicates that the portable computer is not docked, the program displays a message that the devices at the docking station will not be recognized (i.e., usable) until the system is re-booted (step S44). In either case, after displaying the appropriate message, the program gives the user the option of exiting the operating system and shutting down the system (step S48).

Figure 4:
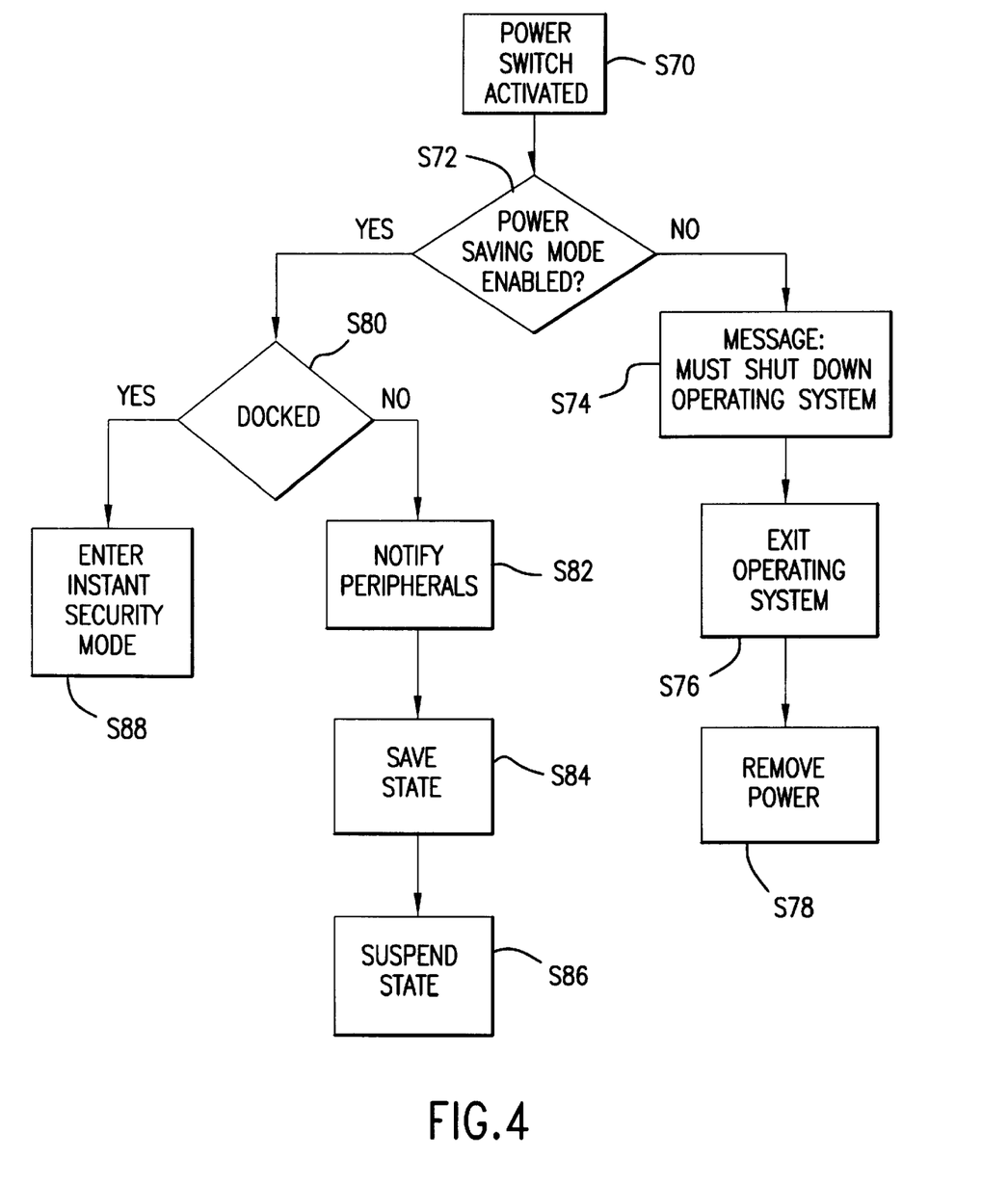
FIG. 4 is a flow chart for the powering down system of a preferred embodiment of the present invention.

FIG. 4 shows a flow chart for an embodiment of the system for powering down. To initiate a powering down of the computer system, the user presses the power switch. However, because data may be lost and files corrupted if the system is powered down while the operating system is running, the system software prevents power from being removed from the system while the operating system is running. That is, the system software includes an exit utility program that executes when the operating system is active and an interrupt is generated in response to the power switch. The exit program determines how to shut down the system when the power switch is pressed based on: 1) whether the portable computer is docked or undocked; and 2) whether the portable computer is in the power saving mode or the boot mode.

More specifically, when the computer is running and the power switch is pressed (step S70), the BIOS generates an interrupt. This interrupt is trapped and rejected so as to disable an immediate power down, and then the exit program is launched. The exit program checks the configuration file to determine whether the portable computer is docked or undocked, and checks the BIOS to determine whether the computer is in the boot mode or the power saving mode (step S72). If the portable computer is in the boot mode, a message is displayed to notify the user that the operating system must be exited before the system can be powered down (step S74). After notifying the user, the program generates an exit call to the operating system (step S76). In response, the operating system closes all application programs that are running and then shuts itself down.

After the operating system has been properly shut down, the exit program calls the power system to power down the portable computer (step S78). In further embodiments, the exit program generates an "exit and power down" call to the operating system, which then both exits and powers down the computer. When in the boot mode, this sequence of operations is performed because activation of the power switch with the power saving features disabled indicates a desire to completely power down the system without saving the current operating state. Therefore, after the operating system and all application programs are properly exited so that data loss is avoided, power is completely removed from the system.

Alternatively, if the portable computer system is in the power saving mode and is undocked, the exit program transitions the portable computer to the suspend state. As explained above, such a transition includes calls to all device drivers to notify them of the upcoming transition to the suspend state (step S82). In response, the device drivers can store relevant information so that the drivers will not have to be re-initialized when the system transitions back to the normal operating state. For example, a call to the device driver for a PCMCIA card enables the driver to save relevant operating information before the card is powered down. After all relevant CPU and peripheral device information is stored (step S84), the exit program puts the portable computer into the suspend state (step S86), which consumes an extremely small amount of power. On the other hand, if the portable computer system is in the power saving mode and is docked, the exit program places the computer system in the instant security mode (step S88). As explained above, this locks the keyboard and display so that the keyboard does not generate any input and the display is blanked.

When in the power saving mode, these sequences of operations are performed because activation of the power switch with the power saving features enabled indicates a desire to enter the suspend state, from which the current state can be recovered. Thus, if the portable computer is docked, the system is connected to an AC power source so the keyboard is displayed and the display is blanked. This allows the CPU and all peripheral devices to remain in their current state for a quick and flawless restart, while preventing the loss of any data. Additionally, if the system remains locked and inactive for a specified period, the APM driver or BIOS may power down unused peripherals or transition the system to the suspend state. Similarly, if the portable computer is undocked, the system may not be connected to an AC power source so the suspend state is entered immediately. This effectively removes system power and allows the system to later return to the current state, while preventing the loss of any data.

After being shut down by the exit program, the system is restarted when the user again presses the power button. In particular, if power was completely removed from the system (i.e., system was in boot mode), the system is restarted by applying power and re-booting the system. If the system was put into the suspend state (i.e., system was in power saving mode and undocked), the system is restarted by returning it to the normal (full-on) operating state in the manner described above. If the system was put into the instant security mode (i.e., system was in power saving mode and docked), the system is restarted by exiting from the instant security mode to unlock the keyboard and display (assuming that the system was not also put into the suspend state).

As previously explained, the present invention provides a system that reliably and efficiently powers down a portable computer having a power saving mode. The power down system determines the appropriate system shut down sequence that will prevent data loss based on whether the portable computer is docked or undocked and whether the power saving mode is enabled or disabled. Embodiments of the present invention ensure that before power is removed either: the operating system and all application programs are exited; or the current state of the system is made recoverable. This lessens the chance of data loss by preventing the system from simply removing power to the system while the operating system is running. In particular, before power is removed, data associated with the running operating system and application programs is saved and the operating system is given the chance to flush all write buffers so that system and user data is not lost and files are not corrupted.

The embodiments of the present invention described above relate to systems that do not have "plug-and-play" capabilities running the Windows™ operating system. However, the power down system of the present invention could be implemented with other operating systems or on computer systems that do provide "plug-and-plug" or other features. Similarly, while the above embodiments are described in relation to the APM system of power management, other types of power management systems with varying features and abilities could be used in conjunction with the power down system of the present invention. Additionally, other design choices, such as the computer system's architecture, the connected peripheral devices, and the features and additional capabilities of the docking station could easily be adapted. Furthermore, embodiments of the present invention may not include all of the features described above. For example, the system software may not maintain its own time and date information in RAM and the system software may not prevent undocking when the operating system is running in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. In a computer system having a docking station and a portable computer adapted to be mechanically and electronically engaged with the docking station, the portable computer having an operating system, the portable computer having an actuator for enabling a user to disengage the portable computer from the docking station, the improvement comprising a utility program encoded on a memory which is executable in response to selection of the actuator, the utility program including:

logic executable on the portable computer for detecting whether the portable computer is engaged with the docking station;

logic executable on the portable computer for detecting an ejection signal transmitted in response to a user selection of the actuator for disengaging the portable computer from the docking station; and logic executable on the portable computer for generating a message on a display to instruct termination of the operating system prior to disengaging and for preventing any disengagement of the portable computer from the docking station in response to the ejection signal when the portable computer is engaged with the docking station while the operating system is executing until the user manually selects to terminate execution of the operating system.

2. The computer system of claim 1, wherein the portable computer further includes a display, and wherein the utility program further includes logic for initiating a placement of a message on the display in response to the ejection signal when the portable computer is engaged with the docking station while the operating system is executing.

3. The computer system of claim 1, wherein the message on the display provides a prompt to a user for powering down the portable computer before initiating disengagement of the portable computer from the docking station.

4. A computer readable medium encoded with a program for execution on a portable computer, the portable computer being adapted to be mechanically and electronically engaged with a docking station, the portable computer having an operating system and an actuator for enabling a user to disengage the portable computer from the docking station, the program including instructions for performing the steps of:

detecting whether the portable computer is engaged with the docking station;

detecting an ejection signal transmitted in response to a user selection of the actuator for disengaging the portable computer from the docking station; and generating a message on a display to instruct termination of the operating system prior to disengaging and preventing any disengagement of the portable computer from the docking station in response to the ejection signal when the portable computer is engaged with the docking station while the operating system is executing until the user manually selects to terminate execution of the operating system, wherein the program is a utility program adapted for storing on a memory of the portable computer, and wherein the utility program is configured to respond to an interrupt initiated upon a selection of the actuator.

5. The computer readable medium of claim 4, wherein the portable computer further includes a display, and wherein the utility program further includes logic for initiating a placement of a message on the display in response to the ejection signal when the portable computer is engaged with the docking station while the operating system is executing.

6. The computer readable medium of claim 5, wherein the message on the display provides a prompt to a user for powering down the portable computer before initiating disengagement of the portable computer from the docking station.

* * * * *